United States Patent
Kong

(10) Patent No.: US 9,484,776 B2
(45) Date of Patent: Nov. 1, 2016

(54) MOTOR

(71) Applicant: LG INNOTEK CO., LTD., Seoul (KR)

(72) Inventor: Bong Bae Kong, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 252 days.

(21) Appl. No.: 14/109,210

(22) Filed: Dec. 17, 2013

(65) Prior Publication Data

US 2014/0167548 A1    Jun. 19, 2014

(30) Foreign Application Priority Data

Dec. 17, 2012  (KR) .................. 10-2012-0147319

(51) Int. Cl.
H02K 1/27    (2006.01)

(52) U.S. Cl.
CPC .............. *H02K 1/274* (2013.01); *H02K 1/278* (2013.01); *H02K 2201/06* (2013.01)

(58) Field of Classification Search
CPC ............... H02K 1/2726; H02K 1/278; H02K 2201/06; H02K 1/274
USPC ............ 310/156.36, 156.37, 156.47, 156.53, 310/156.01
See application file for complete search history.

(56) References Cited

U.S. PATENT DOCUMENTS

| | | | | |
|---|---|---|---|---|
| 2011/0175481 A1* | 7/2011 | Kebukawa | .............. | H02K 29/03 310/156.45 |
| 2012/0175988 A1* | 7/2012 | Hino | .................... | H02K 1/276 310/156.38 |
| 2013/0320796 A1* | 12/2013 | Vyas | .................. | H02K 1/2766 310/156.43 |

FOREIGN PATENT DOCUMENTS

| | | | |
|---|---|---|---|
| JP | 11206049 | A | 7/1999 |
| JP | 2000324736 | A | 11/2000 |
| JP | 2004007960 | A | 1/2004 |
| JP | 2006166515 | A | 6/2006 |
| JP | 2008148447 | A | 6/2008 |
| JP | 2012157236 | A | 8/2012 |

OTHER PUBLICATIONS http://www.schoolphysics.co.uk/age16-19/Electricity%20and%20magnetism/Electromagnetism/text/Flux_and_flux_density/index.html.*
http://hyperphysics.phy-astr.gsu.edu/hbase/magnetic/fluxmg.html.*
Office Action dated Nov. 29, 2013 in Korean Application No. 10-2012-0147319.
European Search Reported dated Jan. 21, 2016, in European Application No. 13197427.1.

* cited by examiner

*Primary Examiner* — Quyen Leung
*Assistant Examiner* — Noli Manaloto
(74) *Attorney, Agent, or Firm* — Saliwanchik, Lloyd & Eisenschenk

(57) ABSTRACT

A rotor of a motor includes a first rotor that includes a first rotor core and a plurality of first magnets that are coupled to an outer circumferential surface of the first rotor core, a second rotor that includes a second rotor core and a plurality of second magnets that are coupled to an outer circumferential surface of the second rotor core, and a third rotor that is stacked between the first rotor and the second rotor and includes a third rotor core and a plurality of third magnets that are coupled to an outer circumferential surface of the third rotor core, wherein magnetic fluxes of the plurality of third magnets are less than magnetic fluxes of the plurality of first magnets or second magnets.

9 Claims, 8 Drawing Sheets

MOTOR

CROSS-REFERENCE TO RELATED APPLICATION

This application claims the benefit under 35 U.S.C. §119 of Korean Patent Application No. 10-2012-0147319, filed Dec. 17, 2012, which is hereby incorporated by reference in its entirety.

BACKGROUND

1. Field of the Invention

The present invention relates to a motor, and more particularly, to a rotor of a motor.

2. Discussion of Related Art

In general, a motor includes a rotating shaft, a rotor that surrounds the rotating shaft, a stator that is spaced a predetermined interval from the rotor, and a housing that fixes the stator.

The rotating shaft may be supported by the housing. The rotor includes a rotor core that surrounds the rotating shaft and a drive magnet that is coupled to the rotor core. The stator includes a plurality of stator cores and coils that are wound around each of the plurality of stator cores. When current is applied to the stator, the rotor rotates due to interaction between the stator and the rotor.

When the motor rotates, cogging torque that is a radial force moving to a position at which magnetic energy is minimum may be generated due to the interaction between the rotor and the stator. The cogging torque may affect quality and user satisfaction.

In order to reduce the cogging torque, a plurality of the rotors may be stacked such that the drive magnets coupled to outer circumferential surfaces of the rotor cores are skewed with one another.

Although the cogging torque may be reduced in this case, outputs of the motors may be reduced due to skew angles.

BRIEF SUMMARY

The present invention is directed to a structure of a rotor of a motor.

According to an aspect of the present invention, there is provided a rotor of a motor, the rotor including: a first rotor that includes a first rotor core and a plurality of first magnets that are coupled to an outer circumferential surface of the first rotor core; a second rotor that includes a second rotor core and a plurality of second magnets that are coupled to an outer circumferential surface of the second rotor core; and a third rotor that is stacked between the first rotor and the second rotor and includes a third rotor core and a plurality of third magnets that are coupled to an outer circumferential surface of the third rotor core, wherein magnetic fluxes of the plurality of third magnets are less than magnetic fluxes of the plurality of first magnets or second magnets.

The plurality of third magnets may include materials having magnetic fluxes that are less than magnetic fluxes of the plurality of first magnets or second magnets.

The plurality of third magnets may include ferrite magnets, and the plurality of first magnets or second magnets include rare-earth magnets.

At least one of the plurality of first magnets and the plurality of second magnets may include neodymium magnets, and the plurality of third magnets may include at least one of samarium cobalt magnets and ferrite magnets.

The plurality of third magnets may have sizes that are less than sizes of the plurality of first magnets or second magnets.

The plurality of third magnets may have sizes that are about 60% to about 90% of sizes of the plurality of first magnets or second magnets.

At least one of widths, lengths, thicknesses, and areas of the plurality of third magnets may be about 60% to about 90% of at least one of widths, lengths, thicknesses, and areas of at least one of the plurality of first magnets and second magnets.

The plurality of first magnets and the plurality of third magnets may be skewed at a first skew angle, and the plurality of second magnets and the plurality of third magnets may be skewed at a second skew angle.

At least one of the first skew angle and the second skew angle may be equal to or less than a half slot pitch.

According to another aspect of the present invention, there is provided a motor including: a rotating shaft; a rotor that surrounds the rotating shaft; a stator that is spaced apart from the rotor; and a housing that fixes the stator, wherein the rotor includes: a first rotor that includes a first rotor core and a plurality of first magnets that are coupled to an outer circumferential surface of the first rotor core, a second rotor that includes a second rotor core and a plurality of second magnets that are coupled to an outer circumferential surface of the second rotor core, and a third rotor that is stacked between the first rotor and the second rotor and includes a third rotor core and a plurality of third magnets that are coupled to an outer circumferential surface of the third rotor core, wherein magnetic fluxes of the plurality of third magnets are less than magnetic fluxes of the plurality of first magnets or second magnets.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION

Figure 1:
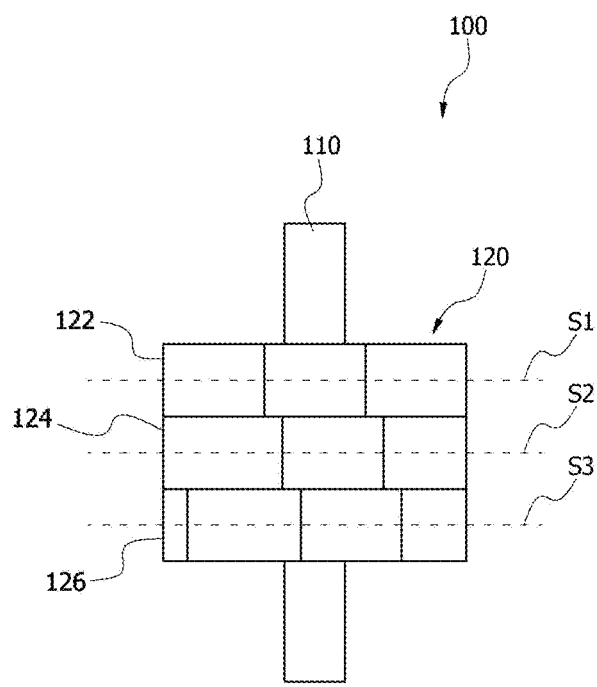
FIG. 1 is a view illustrating a rotor of a motor.

As the invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention.

It will be understood that, although the terms first, second, third etc. may be used herein to describe various elements, these elements should not be limited by these terms. These terms are only used to distinguish one element from another element. Thus, a first element discussed below could be termed a second element and, similarly, a second element could be termed a first element without departing from the teachings of exemplary embodiments. As used herein, the term "and/or," includes any and all combinations of one or more of the associated listed items.

It will be understood that when an element is referred to as being "on", "connected to" or "coupled to" another element, it may be directly on, connected or coupled to the other element or intervening elements may be present. In contrast, when an element is referred to as being "directly on," "directly connected to" or "directly coupled to" another element, there are no intervening elements.

The terminology used herein is for the purpose of describing particular embodiments only and is not intended to be limiting of exemplary embodiments. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, components, or combinations thereof, but do not preclude the presence or addition of one or more other features, integers, steps, operations, elements, components, or combinations thereof.

Unless otherwise defined, all terms (including technical and scientific terms) used herein have the same meaning as commonly understood by one of ordinary skill in the art to which exemplary embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention will now be described more fully with reference to the accompanying drawings, in which exemplary embodiments of the present invention are shown. In the drawings, the same elements are denoted by the same reference numerals and a repeated explanation thereof will not be given.

FIG. 1 is a view illustrating a rotor 120 of a motor 100.

Referring to FIG. 1, the motor 100 includes a rotating shaft 110, the rotor 120 that surrounds the rotating shaft 110, a stator (not shown) that is spaced a predetermined interval from the rotor 120, and a housing (not shown) that fixes the stator.

The rotating shaft 110 may be supported by the housing. The rotor 120 interacts with the stator, and rotates along with the rotating shaft 110.

The rotor 120 may be formed by vertically stacking a plurality of rotors. For example, the rotor 120 may include an upper rotor 122, an intermediate rotor 124, and a lower rotor 126 which are stacked. Each of the upper, intermediate, and lower rotors 122, 124, and 126 may include a rotor core and a plurality of drive magnets that are coupled to an outer circumferential surface of the rotor core. N pole magnets and S pole magnets may be alternately disposed on the outer circumferential surface of each rotor core.

In order to reduce cogging torque that is generated due to interaction between the rotor 120 and the stator, the drive magnets of the rotors are skewed. That is, the drive magnets of the upper rotor 122 and the drive magnets of the intermediate rotor 124 may be skewed at a predetermined skew angle, and the drive magnets of the intermediate rotor 124 and the drive magnets of the lower rotor 126 may be skewed at the predetermined skew angle.

Figure 2:
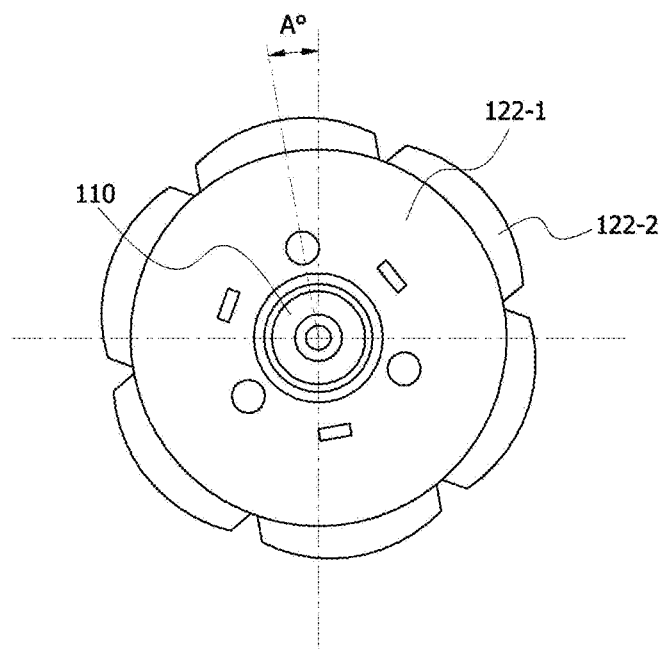
FIGS. 2 through 4 are cross-sectional views respectively illustrating an upper rotor, an intermediate rotor, and a lower rotor according to an embodiment of the present invention.
Figure 3:
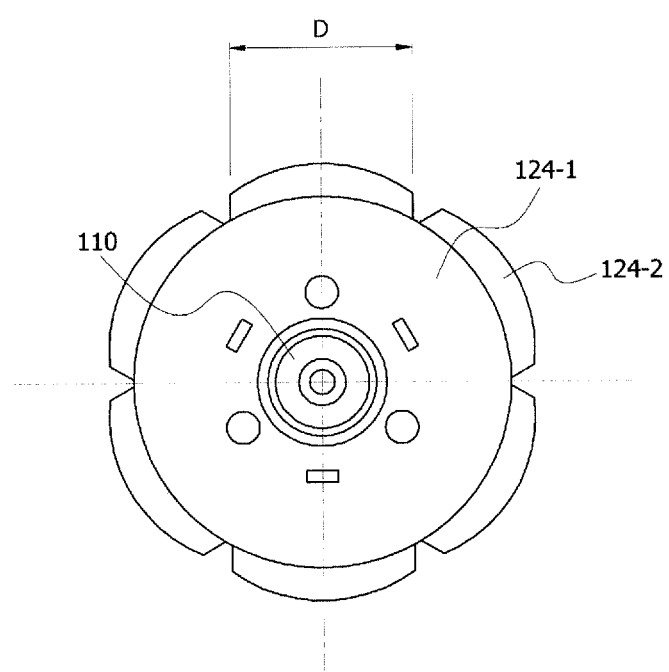
Figure 4:
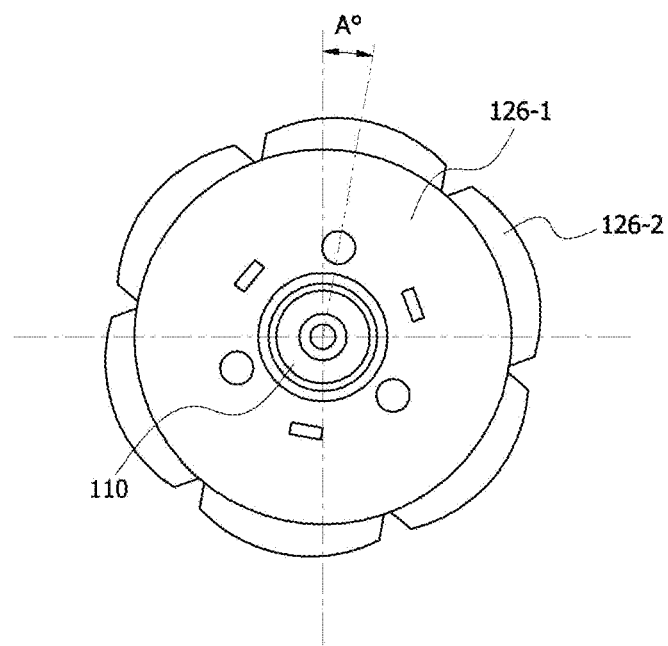

FIGS. 2 through 4 are cross-sectional views respectively illustrating the upper rotor 122, the intermediate rotor 124, and the lower rotor 126 according to an embodiment of the present invention. FIGS. 2 through 4 are cross-sectional views respectively taken along lines S1, S2, and S3 of FIG. 1.

Referring to FIGS. 2 through 4, the upper rotor 122 includes an upper rotor core 122-1 that surrounds the rotating shaft 110 and a plurality of drive magnets 122-2 that are disposed on an outer circumferential surface of the upper rotor core 122-1. The intermediate rotor 124 includes an intermediate rotor core 124-1 that surrounds the rotating shaft 110 and a plurality of drive magnets 124-2 that are disposed on an outer circumferential surface of the intermediate rotor core 124-1. The lower rotor 126 includes a lower rotor core 126-1 that surrounds the rotating shaft 110 and a plurality of drive magnets 126-2 that are disposed on an outer circumferential surface of the lower rotor core 126-1. In this case, the drive magnets 122-2 that are disposed on the upper rotor core 122-1 and the drive magnets 124-2 that are disposed on the intermediate rotor core 124-1 are skewed at a predetermined skew angle of $A°$. The drive magnets 124-2 that are disposed on the intermediate rotor core 124-1 and the drive magnets 126-2 that are disposed on the lower rotor core 126-1 are skewed at the predetermined skew angle of $A°$.

This serves to reduce cogging torque. The predetermined skew angle of $A°$ may be an angle that corresponds to, for example, a half slot pitch.

A normal output may be obtained when poles of the stator and the rotor 120 are at correct positions. Accordingly, as a skew angle increases, the poles of the stator and the rotor 120 are deviated from the correct positions, thereby reducing an output of the motor.

In order to reduce cogging torque and increase an output of the motor, magnetic fluxes of the drive magnets 124-2 of the intermediate rotor 124 may be less than magnetic fluxes of the drive magnets of the upper rotor and the lower rotor.

Figure 5:
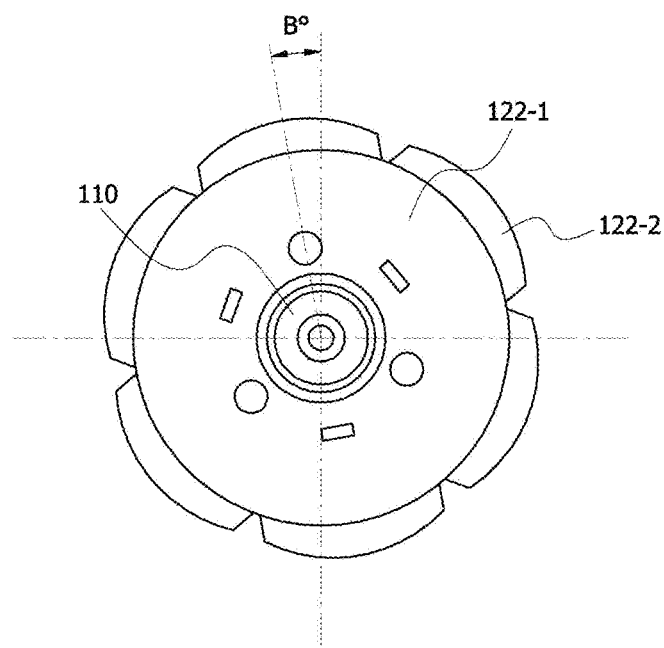
FIGS. 5 through 7 are cross-sectional views illustrating an upper motor, an intermediate rotor, and a lower motor according to another embodiment of the present invention.
Figure 6:
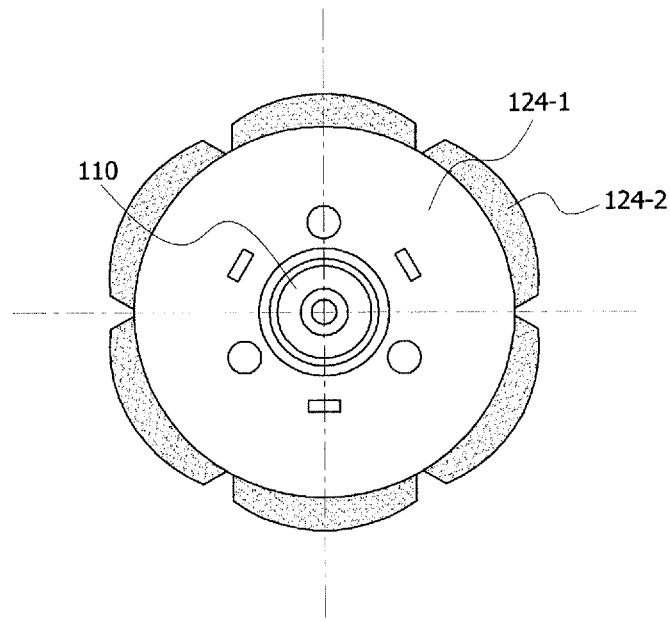
Figure 7:
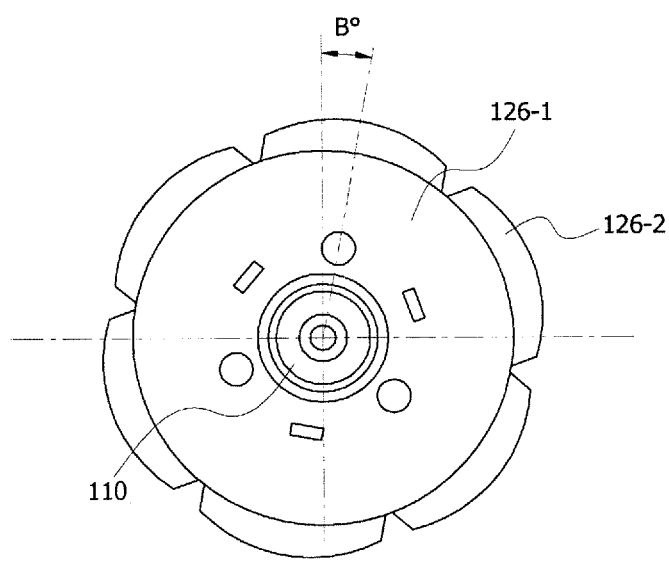

FIGS. 5 through 7 are cross-sectional views illustrating the upper rotor 122, the intermediate rotor 124, and the lower rotor 126 according to another embodiment of the present invention. FIGS. 5, 6, and 7 are cross-sectional views respectively taken along lines S1, S2, and S3 of FIG. 1.

Referring to FIGS. 5 through 7, the upper rotor 122, the intermediate rotor 124, and the lower rotor 126 may be stacked to surround the rotating shaft 110, the drive magnets 122-2 that are disposed on the upper rotor core 122-1 and the drive magnets 124-2 that are disposed on the intermediate rotor core 124-1 may be skewed at a predetermined skew angle, and the drive magnets 124-2 that are disposed on the intermediate rotor core 124-1 and the drive magnets 126-2 that are disposed on the lower rotor core 126-1 may be skewed at the predetermined skew angle, like in FIGS. 2 through 4.

In this case, the drive magnets 124-2 that are disposed on the intermediate rotor core 124-1 may be formed of materials having magnetic fluxes that are less than magnetic fluxes of the drive magnets 122-2 that are disposed on the upper rotor core 122-1 and the drive magnets 126-2 that are disposed on the lower rotor core 126-1.

In general, rare-earth magnets (e.g., neodymium iron boron (NdFeB) magnets and samarium cobalt (SmCo) magnets) have magnetic fluxes that are greater than those of ferrite magnets. Accordingly, when the drive magnets 122-2 that are disposed on the upper rotor core 122-1 and the drive magnets 126-2 that are disposed on the lower rotor core 126-1 are rare-earth magnets, the drive magnets 124-2 that are disposed on the intermediate rotor core 124-1 may be ferrite magnets. Accordingly, the use of rare-earth magnets, which are subject to high price increase rates, is reduced, thereby reducing manufacturing costs.

Among rare-earth magnets, NdFeB magnets have magnetic fluxes that are greater than those of SmCo magnets. Accordingly, when the drive magnets 122-2 that are disposed on the upper rotor core 122-1 and the drive magnets 126-2 that are disposed on the lower rotor core 126-1 are NdFeB magnets, the drive magnets 124-2 that are disposed on the intermediate rotor core 124-1 may be SmCo magnets or ferrite magnets.

As such, when the drive magnets 124-2 that are disposed on the intermediate rotor core 124-1 are formed of materials having magnetic fluxes that are less than those of the drive magnets 122-2 or 126-2 that are disposed on the upper rotor core 122-1 or the lower rotor core 126-1, low cogging torque may be maintained even when a skew angle of B° is reduced.

Figure 8:
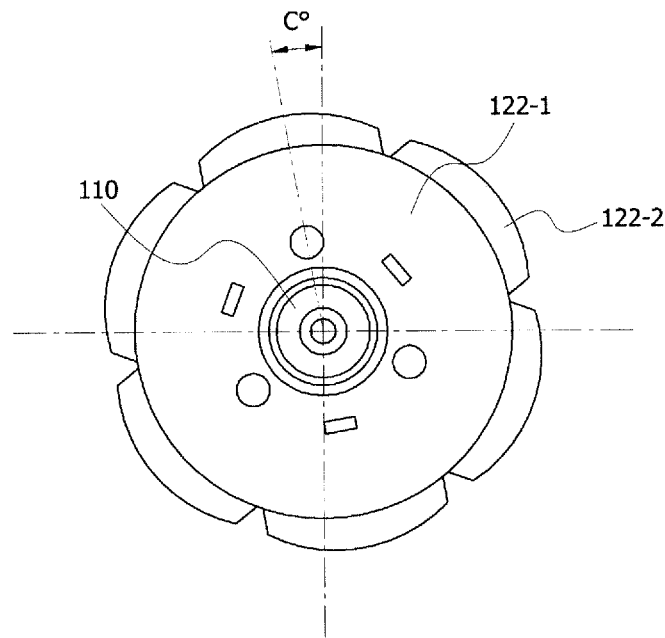
FIGS. 8 through 10 are cross-sectional views illustrating an upper rotor, an intermediate rotor, and a lower motor according to another embodiment of the present invention.
Figure 9:
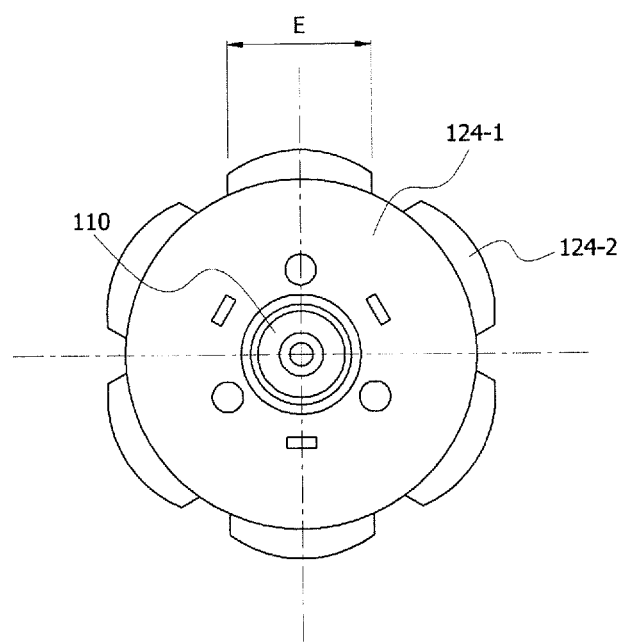
Figure 10:
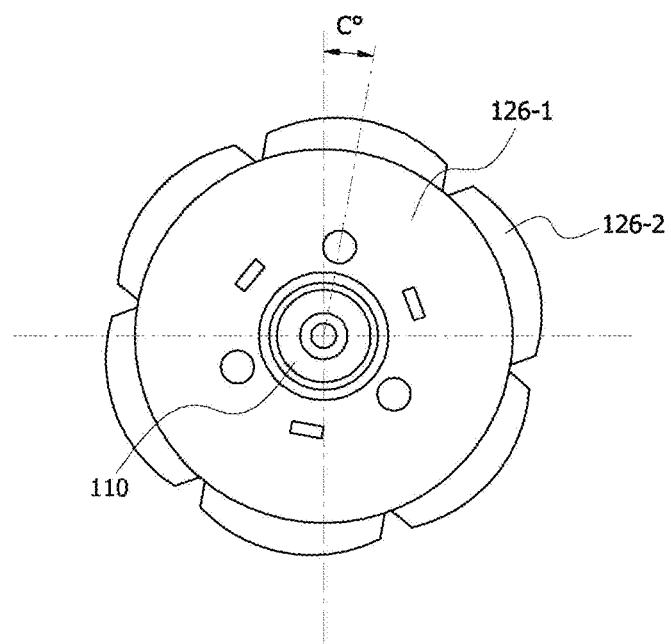

FIGS. 8 through 10 are cross-sectional views illustrating the upper rotor 122, the intermediate rotor 124, and the lower rotor 126 according to another embodiment of the present invention. FIGS. 8, 9, and 10 are cross-sectional views respectively taken along lines S1, S2, and S3 of FIG. 1.

Referring to FIGS. 8 through 10, the upper rotor 122, the intermediate rotor 124, and the lower rotor 126 are stacked to surround the rotating shaft 110, and the drive magnets 122-2 that are disposed on the upper rotor core 122-1, the drive magnets 124-2 that are disposed on the intermediate rotor core 124-1 are skewed at a predetermined skew angle, and the drive magnets 124-2 that are disposed on the intermediate rotor core 124-1 and the drive magnets 126-2 that are disposed on the lower rotor core 126-1 are skewed at the predetermined skew angle, like in FIGS. 2 through 4.

In this case, the drive magnets 124-2 that are disposed on the intermediate rotor core 124-1 may have sizes that are less than those of the drive magnets 122-2 that are disposed on the upper rotor core 122-1 and the drive magnets 126-2 that are disposed on the lower rotor core 126-1. That is, widths E (see FIG. 9), thicknesses, lengths, or areas of the drive magnets 124-2 that are disposed on the intermediate rotor core 124-1 may be less than widths D (see FIG. 3, D>E), thicknesses, lengths, or areas of the drive magnets 122-2 that are disposed on the upper rotor core 122-1 and the drive magnets 126-2 that are disposed on the lower rotor core 126-1. For example, one of widths, lengths, thicknesses, and areas of the drive magnets 124-2 that are disposed on the intermediate rotor core 124-1 may be about 60% to about 90% of one of widths, thicknesses, lengths, and areas of the drive magnets 122-2 that are disposed on the upper rotor core 122-1 and the drive magnets 126-2 that are disposed on the lower rotor core 126-1.

As such, when magnetic fluxes of the drive magnets 124-2 that are disposed on the intermediate rotor core 124-1 are set to be low, a skew angle of B° (see FIGS. 5 through 7, B°<A°) or C.° (see FIGS. 8 through 10, C.°<A°) between drive magnets that are disposed on rotor cores may be reduced in order to balance magnetic fluxes, thereby reducing cogging torque and maintaining a high output of the motor.

According to the one or more embodiments of the present invention, cogging torque may be reduced and a high output of a motor may be maintained. Also, motor manufacturing costs may be reduced.

What is claimed is:

1. A rotor of a motor, the rotor comprising:
a first rotor comprising a first rotor core and a plurality of first magnets that is coupled to an outer circumferential surface of the first rotor core;
a second rotor comprising a second rotor core and a plurality of second magnets that is coupled to an outer circumferential surface of the second rotor core; and
a third rotor stacked between the first rotor and the second rotor, and comprising a third rotor core and a plurality of third magnets that is coupled to an outer circumferential surface of the third rotor core,
wherein magnetic fluxes of the plurality of third magnets are less than magnetic fluxes of the plurality of first magnets or second magnets;
wherein the plurality of third magnets comprises materials having magnetic fluxes that are less than the magnetic fluxes of the plurality of first magnets or second magnets; and
wherein the plurality of first magnets is skewed at a first skew angle with respect to the plurality of third magnets, and the plurality of second magnets is skewed at a second skew angle with respect to the plurality of third magnets.

2. The rotor of claim 1, wherein the plurality of third magnets comprises ferrite magnets, and the plurality of first magnets or second magnets comprises rare-earth magnets.

3. The rotor of claim 1, wherein at least one of the plurality of first magnets and the plurality of second magnets comprises neodymium magnets, and the plurality of third magnets comprises at least one of samarium cobalt magnets and ferrite magnets.

4. The rotor of claim 1, wherein the plurality of third magnets has sizes that are smaller than sizes of the plurality of first magnets or of the plurality of second magnets.

5. The rotor of claim 4, wherein the plurality of third magnets has sizes that are about 60% to about 90% of sizes of the plurality of first magnets or of the plurality of second magnets.

6. The rotor of claim 5, wherein at least one of widths, lengths, thicknesses, and areas of the plurality of third magnets are about 60% to about 90% of at least one of widths, lengths, thicknesses, and areas of at least one of the plurality of first magnets and second magnets.

7. The rotor of claim 1, wherein at least one of the first skew angle and the second skew angle is equal to or smaller than a half slot pitch.

8. A motor comprising:
a rotating shaft;
a rotor surrounding the rotating shaft;
a stator spaced apart from the rotor; and
a housing fixing the stator,
wherein the rotor comprises:
a first rotor comprising a first rotor core and a plurality of first magnets coupled to an outer circumferential surface of the first rotor core, a second rotor comprising a second rotor core and a plurality of second magnets coupled to an outer circumferential surface of the second rotor core, and a third rotor stacked between the first rotor and the second rotor and comprising a third rotor core and a plurality of third magnets coupled to an outer circumferential surface of the third rotor core,
wherein magnetic fluxes of the plurality of third magnets are less than magnetic fluxes of the plurality of first magnets or second magnets;

wherein the plurality of third magnets comprises materials having magnetic fluxes that are less than the magnetic fluxes of the plurality of first magnets or second magnets; and wherein the plurality of first magnets is skewed at a first skew angle with respect to the plurality of third magnets, and the plurality of second magnets is skewed at a second skew angle with respect to the plurality of third magnets.

9. The motor of claim 8, wherein the plurality of third magnets has sizes that are smaller than sizes of the plurality of first magnets or second magnets.

* * * * *